(12) United States Patent
Palani et al.

(10) Patent No.: US 11,575,697 B2
(45) Date of Patent: Feb. 7, 2023

(54) ANOMALY DETECTION USING AN ENSEMBLE OF MODELS

(71) Applicant: Kyndryl, Inc., New York, NY (US)

(72) Inventors: Suba Palani, Bengaluru (IN); Dinesh Babu Yeddu, Guntur (IN)

(73) Assignee: Kyndryl, Inc., New York, NY (US)

( * ) Notice: Subject to any disclaimer, the term of this patent is extended or adjusted under 35 U.S.C. 154(b) by 358 days.

(21) Appl. No.: 16/862,696

(22) Filed: Apr. 30, 2020

(65) Prior Publication Data

US 2021/0344695 A1 Nov. 4, 2021

(51) Int. Cl.
  *G06F 16/28* (2019.01)
  *H04L 9/40* (2022.01)
  *G06N 3/04* (2006.01)
  *G06N 3/08* (2006.01)

(52) U.S. Cl.
  CPC ........ *H04L 63/1425* (2013.01); *G06F 16/285* (2019.01); *G06N 3/0436* (2013.01); *G06N 3/0445* (2013.01); *G06N 3/0454* (2013.01); *G06N 3/088* (2013.01)

(58) Field of Classification Search
  CPC . H04L 63/1425; G06F 16/285; G06N 3/0436; G06N 3/0445; G06N 3/0454; G06N 3/088
  See application file for complete search history.

(56) References Cited

U.S. PATENT DOCUMENTS

| | | | |
|---|---|---|---|
| 8,949,677 B1 | 2/2015 | Brundage et al. | |
| 9,652,354 B2 | 5/2017 | Filimonov et al. | |
| 9,954,882 B2 | 4/2018 | Seo et al. | |
| 10,187,326 B1 | 1/2019 | Anand et al. | |
| 10,270,668 B1 | 4/2019 | Thompson et al. | |
| 10,375,169 B1* | 8/2019 | Diallo | G06F 11/301 |
| 11,444,964 B2* | 9/2022 | Sternby | H04L 63/1425 |

(Continued)

OTHER PUBLICATIONS

Brownlee, Jason, Apr. 17, 2020, Machine Learning Mastery <machinelearningmastery.com/voting-ensembles-with-python> (Year: 2020).*

(Continued)

*Primary Examiner* — Hosain T Alam
*Assistant Examiner* — Robert F May
(74) *Attorney, Agent, or Firm* — Erik Swanson, Esq.; Kevin P. Radigan, Esq.; Heslin Rothenberg Farley & Mesiti P.C.

(57) ABSTRACT

Described are techniques for automated anomaly detection including a technique comprising training an ensemble of deep learning models using clustered time series training data from numerous components in an Information Technology (IT) infrastructure. The technique further comprises inputting aggregated time series data to the ensemble of deep learning models and identifying anomalies in the aggregated time series data based on respective portions of the aggregated time series data that are indicated as anomalous by a majority of deep learning models in the ensemble of deep learning models. The technique further comprises grouping the anomalies according to relationships between the anomalies and performing a mitigation action in response to grouping the anomalies.

20 Claims, 6 Drawing Sheets

(56) References Cited

U.S. PATENT DOCUMENTS

| | | | | |
|---|---|---|---|---|
| 2012/0137367 | A1* | 5/2012 | Dupont | G06F 21/00 726/25 |
| 2016/0352764 | A1* | 12/2016 | Mermoud | H04L 63/1425 |
| 2017/0032130 | A1* | 2/2017 | Joseph Durairaj | H04L 41/16 |
| 2019/0057197 | A1* | 2/2019 | Wang | G06F 16/958 |
| 2019/0138643 | A1* | 5/2019 | Saini | G06F 16/2474 |
| 2019/0319971 | A1* | 10/2019 | Levy | H04L 63/1441 |
| 2019/0324831 | A1 | 10/2019 | Gu | |
| 2019/0356533 | A1 | 11/2019 | Vasseur et al. | |
| 2020/0210809 | A1* | 7/2020 | Kaizerman | G06N 3/04 |
| 2020/0231466 | A1* | 7/2020 | Lu | G01N 33/18 |
| 2021/0073658 | A1* | 3/2021 | Poole | G06F 11/3065 |

OTHER PUBLICATIONS

Buda et al., "DeepAD: A Generic Framework Based on Deep Learning for Time Series Anomaly Detection", Jun. 19, 2018, Advances in Knowledge Discovery and Data Mining PAKDD 2018. Lecture Notes in Computer Science( ), vol. 10937. Springer, Cham, https://doi.org/10.1007/978-3-319-93034-3_46 (Year: 2018).*

Izakian et al. "Fuzzy clustering of time series data using dynamic time warping distance", Mar. 2015, Engineering Applications of Artificial Intelligence, vol. 39, pp. 235-244. (Year: 2015).*

Brownlee, Jason, "LSTM Modle Architecture for Rare Event Time Series Forecasting", Aug. 5, 2019, <https://machinelearningmastery.com/lstm-model-architecture-for-rare-event-time-series-forecasting> (Year: 2019).*

Malhotra et al., "Long Short Term Memory Networks for Anomaly Detection in Time Series", ESANN 2015 proceedings, European Symposium on Artificial Neural Networks, Computational Intelligence and Machine Learning, Apr. 22-24, 2015, pp. 89-94.

Malhotra et al., "LSTM-based Encoder-Decoder for Multi-sensor Anomaly Detection", timearXiv:1607.00148v2 [cs.AI], Jul. 11, 2016, 5 pages.

Mell et al., "The NIST Definition of Cloud Computing", Recommendations of the National Institute of Standards and Technology, Sep. 2011, 7 pages.

* cited by examiner

ANOMALY DETECTION USING AN ENSEMBLE OF MODELS

BACKGROUND

The present disclosure relates to computer security and, more specifically, to automated anomaly detection.

Anomaly detection tools can provide information (e.g., graphs, charts, tables, etc.) related to performance metrics for various Information Technology (IT) infrastructure assets such as, but not limited to, servers, routers, hubs, modems, storage systems, software, public clouds, private clouds, hybrid clouds, endpoint devices, computers, laptops, tablets, phones, and/or other physical or virtually provisioned IT assets. The performance metrics can directly or indirectly indicate anomalous behavior. Anomalous behavior in an IT infrastructure can be indicative of, for example, cyberattacks, failing hardware, malfunctioning hardware or software, and the like.

SUMMARY

Aspects of the present disclosure are directed toward a computer-implemented method comprising training an ensemble of deep learning models using clustered time series training data from numerous components in an Information Technology (IT) infrastructure. The method further comprises inputting aggregated time series data to the ensemble of deep learning models. The method further comprises identifying anomalies in the aggregated time series data based on respective portions of the aggregated time series data that are indicated as anomalous by a majority of deep learning models in the ensemble of deep learning models. The method further comprises grouping the anomalies according to relationships between the anomalies. The method further comprises performing a mitigation action in response to grouping the anomalies.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
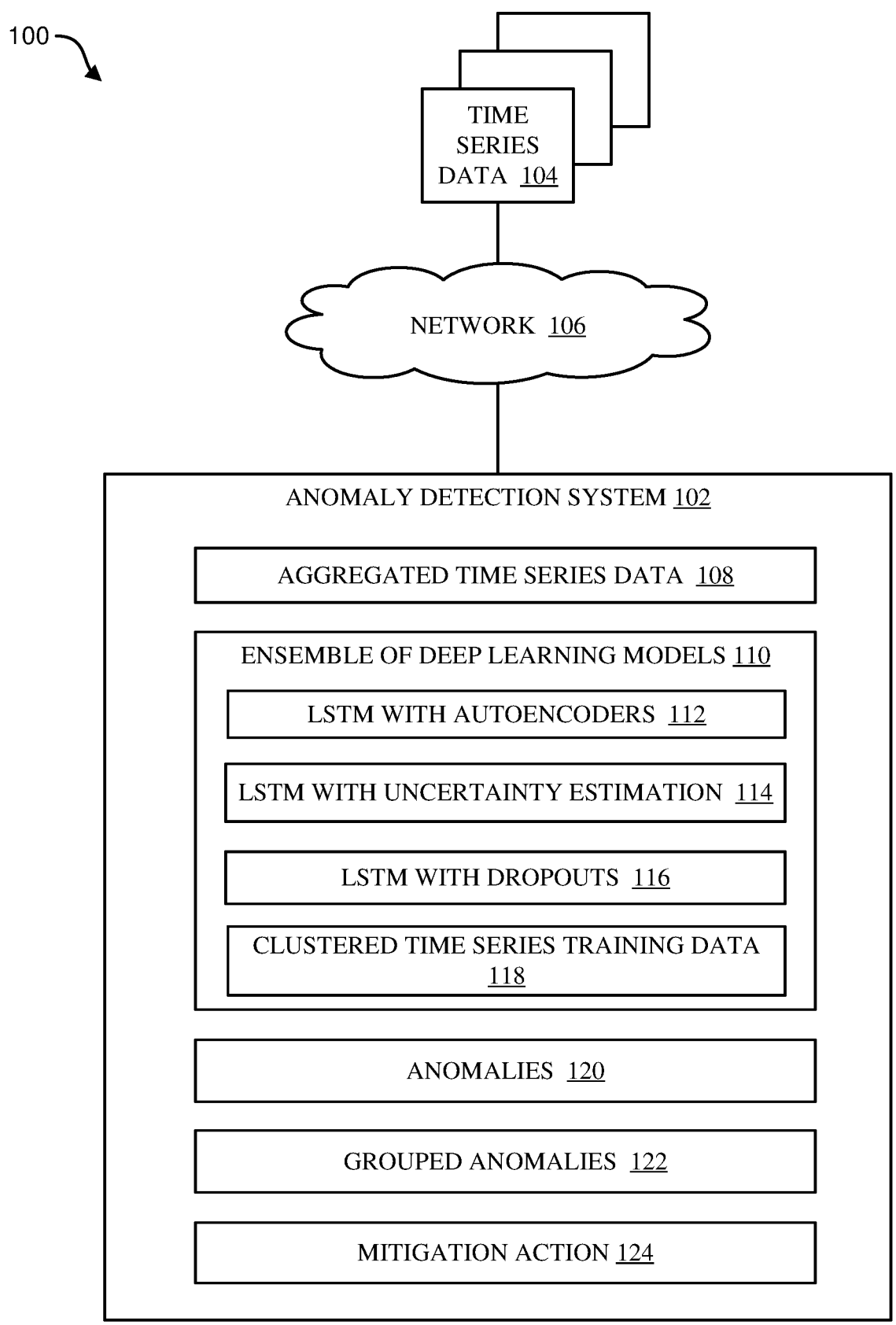
FIG. 1 illustrates a block diagram of an example computational environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward computer security and, more specifically, to automated anomaly detection. While not limited to such applications, embodiments of the present disclosure may be better understood in light of the aforementioned context.

Various techniques exist for automated anomaly detection. For example, one technique for anomaly detection utilizes static thresholds that define upper and lower bounds for normal behavior. Disadvantageously, static thresholds do not accommodate fluctuations in usage patterns, where these fluctuations do not necessarily constitute anomalous behavior. Accordingly, using static thresholds to identify anomalies can result in a high rate of false positives (e.g., identification of anomalies that are not, in fact, anomalies) during fluctuating usage patterns.

Another technique for anomaly detection utilizes supervised algorithms where a machine learning model is trained on a manually labeled training data set that identifies each piece of training data as anomalous or not anomalous. Disadvantageously, supervised algorithms require a significant amount of labeled training data. Creating the labeled training data is time-consuming. Furthermore, the labeled training data can quickly become antiquated as usage patterns, system configurations, and attack vectors change over time.

Another technique for anomaly detection utilizes clustering whereby normal data is assigned to a first cluster (or a first set of clusters) and anomalous data is assigned to another cluster (or another set of clusters). Disadvantageously, clustering is not conducive to time-stamped (e.g., continuously generated) data. Furthermore, the boundaries of "normal" and "anomalous" clusters can change over time (even occasionally overlapping) due to changing system configurations and usage patterns.

Another technique for anomaly detection utilizes Holt-Winters algorithms and/or Auto-Regressive Integrated Moving Average (ARIMA) algorithms whereby future data values are predicted and a prediction error relative to the observed value is used to detect anomalies (where an error between a predicted value and an observed value above a threshold can be considered an anomaly). Disadvantageously, these algorithms require stationarity in the data (e.g., where stationarity can refer to the statistical properties of a time-series of data remaining consistent). However, complex, multi-modal systems do not necessarily exhibit stationarity as changes in configuration and/or usage of IT infrastructure may alter the statistical properties of the data generated by the IT infrastructure during normal usage.

In light of the aforementioned challenges and drawbacks of various anomaly detection techniques, there is a need for an accurate automated anomaly detection technique that is capable of handling complex, multi-modal data streams that do not necessarily exhibit stationarity. Aspects of the present disclosure fulfill this technical need.

Aspects of the present disclosure are directed toward an automated anomaly detection system exhibiting improved accuracy, improved efficiency, improved usability, and other benefits relative to existing technologies. Regarding improved accuracy, aspects of the present disclosure can detect anomalies using a voting method amongst an ensemble of deep learning models. Thus, although specific types of models may incorrectly label a non-anomalous event as anomalous (e.g., a false positive) or incorrectly label an anomalous event as non-anomalous (e.g., a false negative), aspects of the present disclosure label events according to a majority of the ensemble of deep learning models. This improves accuracy insofar as the majority of models can mitigate the deficiencies of any individual model.

Regarding improved efficiency, aspects of the present disclosure train a respective ensemble of models for every clustered set of time series data rather than for every stream of time series data. Generating models based on clustered sets of time series data rather than individual streams of time series data can substantially reduce the number of models generated (thereby increasing efficiency) with little to no loss in accuracy. For example, an enterprise system may include 1,000 hosts, where 100 of the hosts exhibit similar usage profiles (e.g., processor usage, memory usage, network bandwidth, etc.) or other similarities. Accordingly, a single ensemble of deep learning models can be trained for the 100 hosts that exhibit similar usage profiles, thereby significantly reducing the number of deep learning models that need to be created, trained, deployed, and maintained.

Regarding improved usability, aspects of the present disclosure group detected anomalies according to relationships between the detected anomalies. For example, three anomalies related to processor usage, memory usage, and number of database threads can be grouped together with an overarching issue statement such as, for example, "slow server response." Thus, grouping related anomalies together can improve the usability of the automated anomaly detection system by enabling an administrator to quickly review information for tens or hundreds of anomalies, understand the potential causes and consequences related to each grouping of anomalies, and implement a coherent and effective solution to address each grouping of anomalies, if necessary.

Thus, aspects of the present disclosure generally relate to an anomaly detection system exhibiting improved accuracy, improved efficiency, and improved usability, among other benefits, advantages, and improvements. In order to better illustrate various aspects of the present disclosure, the accompanying drawings will now be described in detail.

FIG. 1 illustrates a computing environment 100, in accordance with some embodiments of the present disclosure. The computing environment 100 includes an anomaly detection system 102 receiving time series data 104 via a network 106.

The time series data 104 can be data generated by, for example, routers, hubs, modems, storage volumes, servers, databases, applications, and the like. The time series data 104 can be numerical data, textual data, or a combination of both, such as, but not limited to, logfile data. The time series data 104 can be received from (or be consistent with) data that would be utilized by, for example, any Security Information and Event Management (SIEM) system. In some embodiments, the time series data 104 are associated with a plurality of similar or dissimilar devices (or virtual manifestations of devices) such as tens, hundreds, or thousands of devices. In some embodiments, the time series data 104 includes numerous continuous data streams (e.g., time-varying data streams that are consistently creating new data). In some embodiments, the time series data 104 can be univariate data (e.g., insofar as a single variable may be changing over time) and/or as multi-model data (e.g., insofar as multiple distinct streams of similar or dissimilar data can be included in time series data 104). The time series data 104 can be provided to the anomaly detection system 102 in real-time (e.g., continuously), approximately real-time, and/or in batches (e.g., intermittently), according to various embodiments.

Anomaly detection system 102 can compile the time series data 104 into aggregated time series data 108. The aggregated time series data 108 can be input to respective ensembles of deep learning models 110. In some embodiments, there is a respective ensemble of deep learning models 110 corresponding to respective clusters of aggregated time series data 108 (e.g., where the aggregated time series data 108 can be clustered into similar clusters as clustered time series training data 118). The ensemble of deep learning models 110 can comprise two or more models such as, for example, a Long Short-Term Memory (LSTM) model with autoencoders 112, a LSTM model with uncertainty estimation 114, and/or a LSTM model with dropouts 116, according to various embodiments. LSTM models are a type of recurrent neural network that is capable of learning sequences of observations. Accordingly, LSTM models are an advantageous deep learning model for time series analyses such as analyzing real-time data for the purposes of anomaly detection.

The LSTM model with autoencoders 112 can refer to an LSTM model utilizing one or more autoencoders to create a compressed form of the input to the LSTM model. Autoencoders can be useful for reducing "noise" in data and reducing the dimensionality of data. Collectively, these aspects of autoencoders can cause the LSTM model with autoencoders 112 to function efficiently and accurately for the purposes of anomaly detection.

The LSTM model with uncertainty estimation 114 is an LSTM model that can include an estimation of the uncertainty associated with its predictions. For example, in some embodiments, the LSTM model with uncertainty estimation 114 utilizes quantile regression to estimate a conditional quantile (e.g., median) of the response variable across values of the predictor variables. Advantageously, the LSTM model with uncertainty estimation 114 can be trained according to a specified quantile of training data (e.g., rather than the mean) thus lending more tunability to the outputs of the LSTM model with uncertainty estimation 114.

The LSTM model with dropouts 116 utilizes a regularization method where input and/or recurrent connections to LSTM nodes are probabilistically excluded from activation and weight updates while training a network. For example, input dropouts mean that for a given probability, the data on the input connection to each LSTM node will be excluded from node activation and weight updates. As another example, recurrent dropouts can be applied to the recurrent input signal on the LSTM nodes. Collectively, one or both of these dropout techniques have the effect of reducing overfitting. Accordingly, the LSTM model with dropouts 116 can lead to improved accuracy in anomaly detection by reducing overfitting.

The ensemble of deep learning models 110 further includes clustered time series training data 118 for training the LSTM model with autoencoders 112, the LSTM model with uncertainty estimation 114, and the LSTM model with dropouts 116. In some embodiments, the clustered time series training data 118 comprises historical data similar to the time series data 104. In some embodiments, the clustered time series training data 118 is clustered using fuzzy clusters with dynamic time-warping distance. Fuzzy clustering (also referred to as soft k-means clustering or simply soft clustering) is a clustering technique whereby each data point can belong to one or more clusters (compared to traditional clustering whereby each data point can belong to one and only one cluster). Dynamic time-warping distance refers to algorithms for measuring similarity between multiple temporal sequences, where each of the multiple temporal sequences can be associated with a different speed or rate. Advantageously, fuzzy clustering with dynamic time-warping distance is better suited to clustering continuous data than traditional clustering methodologies.

One advantage of clustering the clustered time series training data 118 is that respective anomaly detection models in the ensemble of deep learning models 110 can be trained for each cluster of clustered time series training data 118 rather than for each set of time series data. This can reduce the number of anomaly detection models, thereby increasing efficiency (e.g., decreasing processing power, storage volume, and/or network bandwidth required to create, store, and implement the anomaly detection models).

In some embodiments, outliers (e.g., anomalous data) are removed from the training data using statistical methods. For example, generating the clustered time series training data 118 can include removing outliers from the clustered time series training data 118 using an Extreme Studentized Deviate (ESD) test such as, but not limited to, a seasonal hybrid generalized ESD test. Advantageously, a seasonal hybrid generalized EST test can capture outliers of the time series after removing the trend and seasonality components. Furthermore, a seasonal hybrid generalized ESD test can capture both global and local outliers. Advantageously, removing anomalous data improves anomaly detection. For example, if the anomalous data remains in the clustered time series training data 118, the trained LSTM models may characterize anomalies as non-anomalous due to their appearance in the training data. Furthermore, anomalous data is commonly removed using labeled training sets (e.g., where a subject matter expert labels data as anomalous or non-anomalous), however, labeled training sets are time-consuming to create and subject to quickly becoming outdated. Thus, using statistical methods to automatically remove anomalous data from the historical data to generate clustered time series training data 118 is efficient.

The ensemble of deep learning models 110 can identify anomalies 120 from the aggregated time series data 108. Anomalies 120 can indicate hardware failures or degradations, network configuration issues, cyberthreats, software issues (e.g., malfunctions, bugs, etc.), operating system (OS) issues, and so on. Related anomalies 120 can be grouped together in grouped anomalies 122. Grouped anomalies 122 can be made up of anomalies 120 that exhibit child-parent relationships, event similarities, and/or metric similarities. Grouped anomalies 122 can improve usability of the anomaly detection system 102 by grouping respective anomalies 120 that are likely triggered by a same root cause issue.

Grouped anomalies 122 can be used to generate mitigation actions 124. Mitigation actions 124 can be provided to a user interface for consideration, review, implementation, and/or feedback from, for example, a system administrator such as a cybersecurity administrator. In some embodiments, the mitigation actions 124 are automatically implemented by the anomaly detection system 102 such as to migrate data on a failing storage volume, to isolate an infected device from a network, to push a necessary software update to one or more devices, and/or other mitigation actions.

Figure 2:
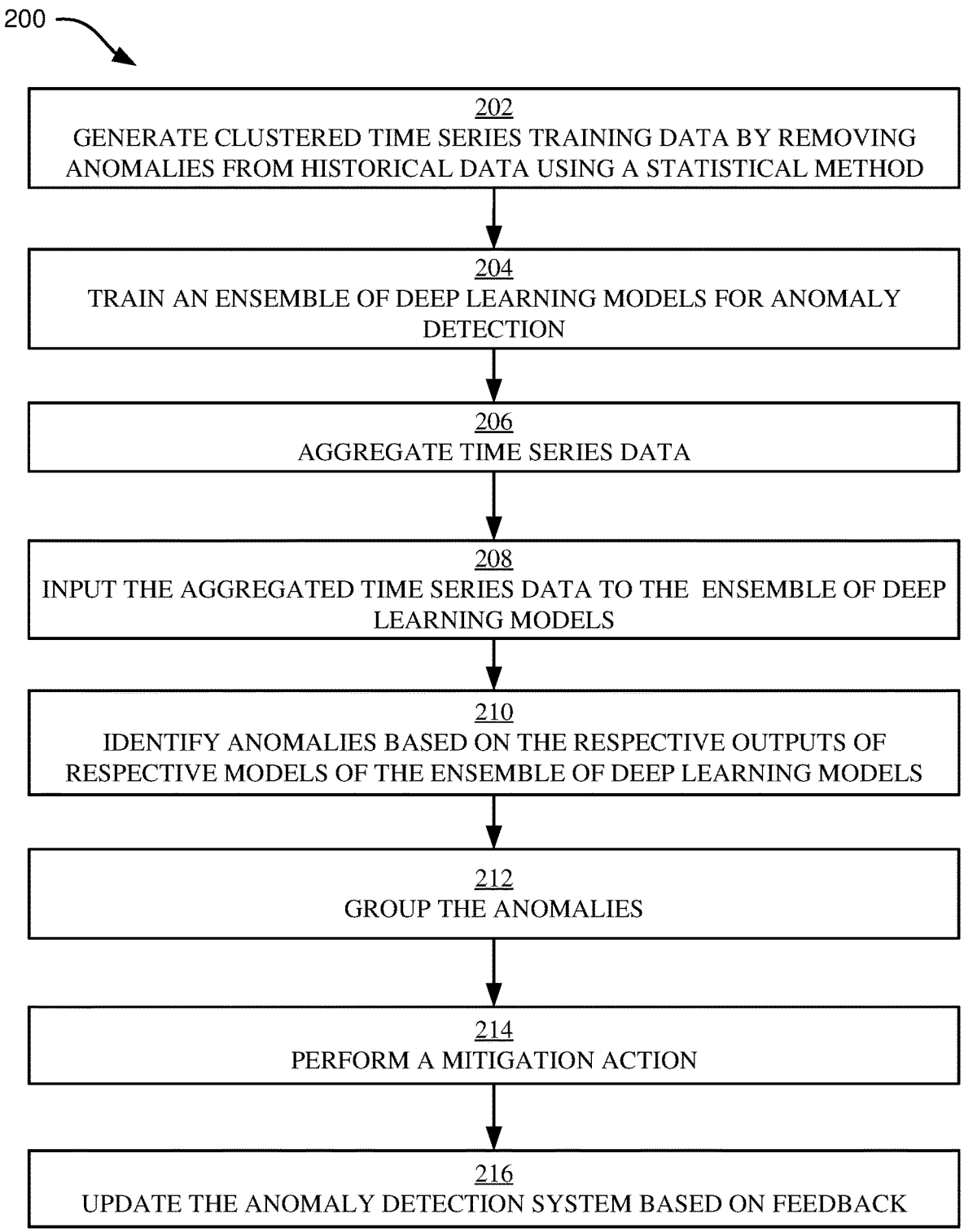
FIG. 2 illustrates a flowchart of an example method for automated anomaly detection, in accordance with some embodiments of the present disclosure.

Referring now to FIG. 2, illustrated is a flowchart of an example method 200 for automatically detecting anomalies, in accordance with some embodiments of the present disclosure. The method 200 can be implemented by, for example, an anomaly detection system 102, a processor, a computer, or another configuration of hardware and/or software.

Operation 202 includes generating clustered time series training data 118 by removing anomalies from historical data using a statistical method. In some embodiments, operation 202 can include removing outliers from the historical data using an Extreme Studentized Deviate (ESD) test such as, but not limited to, a seasonal hybrid generalized ESD test. In some embodiments, operation 202 includes clustering the historical data to create clustered time series training data 118. In some embodiments, the historical data is clustered using fuzzy clusters with dynamic time-warping distance.

Operation 204 includes training an ensemble of deep learning models 110 for anomaly detection using the clustered time series training data 118. In some embodiments, the ensemble of deep learning models 110 can include an LSTM model with autoencoders 112, an LSTM model with uncertainty estimation 114, and/or an LSTM model with dropouts 116.

Operation 206 includes aggregating time series data 104 from one or more devices to generate aggregated time series data 108. Operation 208 includes inputting the aggregated time series data 108 to the ensemble of deep learning models 110. In some embodiments, the ensemble of deep learning models 110 includes three or more deep learning models including an LSTM model with autoencoders 112, an LSTM model with uncertainty estimation 114, and an LSTM model with dropouts 116. As previously discussed, in some embodiments, operation 208 includes respectively inputting the aggregated time series data 108 to respective ensembles of deep learning models 110 that were trained a cluster of clustered time series training data 118 that is consistent with the respective aggregated time series data 108. Said another way, in some embodiments, the number of ensembles of deep learning models 110 can equal the number of clusters in the clustered time series training data 118.

Operation 210 includes identifying anomalies 120 based on the respective outputs of respective models of the ensemble of deep learning models 110. In some embodiments, operation 210 can utilize a voting method from the ensemble of deep learning models 110 to differentiate true anomalies from false positives or false negatives in respective models of the ensemble of deep learning models 110. As an example, one of three deep learning models may characterize a data point as anomalous whereas two of the three deep learning models may characterize the same data point as non-anomalous. Using the voting method, the data point can be characterized according to the classification (anomalous or non-anomalous) provided by the majority of deep learning models in the ensemble of deep learning models 110. Advantageously, using the voting method can reduce false positives and/or false negatives in anomaly detection. Operation 210 is discussed in more detail with respect to FIG. 3A.

Operation 212 includes grouping the anomalies 120 to generate grouped anomalies 122. Grouped anomalies 122 can be associated with one another according to characteristics such as child-parent relationships, similarity to previous anomalous events, and/or other associations that may be determined using machine learning or deep learning (e.g., using autoencoders to reduce the dimensionality of features of the anomalies 120, and where anomalies 120 sharing similar features in the reduced feature set can be grouped together). Advantageously, grouped anomalies 122 can simplify information provided to a user interface and facilitate more effective mitigation actions 124. In other words, numerous anomalies (e.g., tens, hundreds, etc.) can all be caused by a single issue. In such an instance, usability is improved when the numerous anomalies are grouped together under the same issue. Operation 212 is discussed in more detail with respect to FIG. 3B.

Operation 214 includes performing a mitigation action 124. A mitigation action 124 can be, for example, generating an alert, transmitting an alert, altering a configuration (e.g., adding, removing, or isolating components of an IT infrastructure), pushing a software or OS update to one or more devices, migrating data, and/or other mitigation actions. In embodiments where operation 214 includes generating an alert, the alert can include information from any of the previous operations.

Operation 216 includes updating the anomaly detection system 102 based on feedback. For example, the feedback can include, but is not limited to, feedback related to the accuracy of the detected anomalies 120, feedback related to the grouped anomalies 122, feedback related to the description of the anomalies 120 or the grouped anomalies 122, feedback related to an automated mitigation action 124 (if one was implemented), feedback related to recommend mitigation actions 124, and/or other feedback. The feedback can be used to update the anomaly detection system 102. Advantageously, operation 218 can improve the anomaly detection system 102 over time.

As one example, the feedback can be used to update the clustered time series training data 118. Updating the clustered time series training data 118 can alter the classifications of various anomalies 120 and/or grouped anomalies 122. Updating the clustered time series training data 118 can be advantageous insofar as updating the clustered time series training data 118 is generally more efficient and predictable for altering outcomes from the deep learning models in the ensemble of deep learning models 110 than modifying parameters in the deep learning models. In some embodiments, after altering the clustered time series training data 118 based on the feedback, the ensemble of deep learning models 110 are retrained on the updated clustered time series training data 118.

In some embodiments, receiving feedback used to update the clustered time series training data 118 can include receiving feedback from the end-user about whether anomalies 120 are, in fact, anomalous. This can be useful insofar as feedback from the end-user can be used to re-label training data as anomalous or non-anomalous. As previously discussed, anomalous data is removed from the clustered time series training data 118 whereas non-anomalous data is included in the clustered time series training data 118. Thus, if the anomaly detection system 102 receives feedback that an identified anomaly 120 is not, in fact anomalous, then that data point can be included in the clustered time series training data 118 (or vice versa for non-anomalous data that is, in fact, anomalous).

As another example, feedback can be received that indicates a particular group in grouped anomalies 122 is not useful for root cause analysis. In response to receiving such feedback, aspects of the present disclosure can suppress the identified group in grouped anomalies 122 and attempt to generate a new group in grouped anomalies 122 that is more useful for root cause analysis.

Figure 3A:
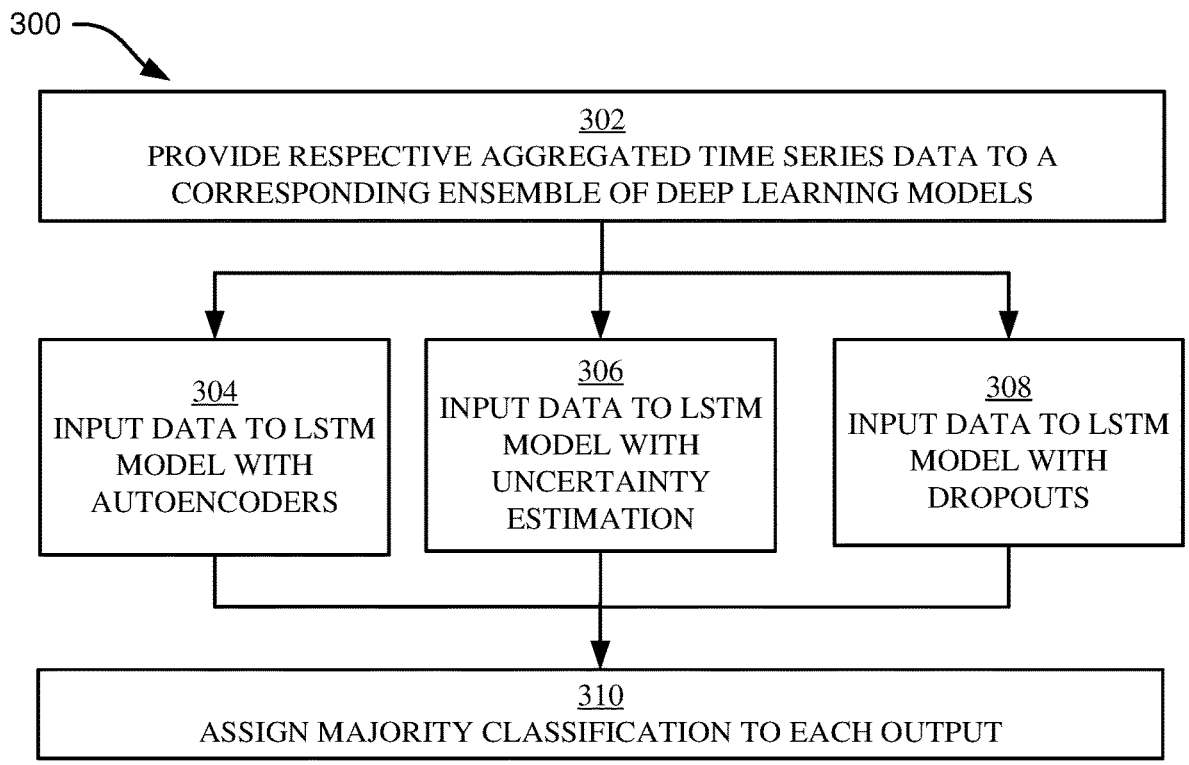
FIG. 3A illustrates a flowchart of an example method for automated anomaly detection utilizing an ensemble of deep learning models, in accordance with some embodiments of the present disclosure.

Referring now to FIG. 3A, illustrated is a flowchart of an example method 300 for using an ensemble of deep learning models 110 to identify anomalies 120, in accordance with some embodiments of the present disclosure. The method 300 can be implemented by, for example, an anomaly detection system 102, a processor, a computer, or another configuration of hardware and/or software. In some embodiments, the method 300 is a sub-method of operation 210 of FIG. 2.

Operation 302 includes providing respective aggregated time series data 108 to a corresponding respective ensemble of deep learning models 110 (where the provided data is consistent with the cluster of clustered time series training data 118 that was used to train the respective ensemble of deep learning models 110). In some embodiments, the ensemble of deep learning models 110 comprises three models, though other numbers of deep learning models are within the spirit and scope of the present disclosure. As is understood by one skilled in the art, every model has strengths and weaknesses. Accordingly, using an ensemble of deep learning models 110 is beneficial for improving the overall accuracy of the anomaly detection system 102 insofar as different models in the ensemble of deep learning models 110 can function to supplement the weaknesses of other models.

Operations 304-308 include inputting the respective data of aggregated time series data 108 to the respective models of the corresponding ensemble of deep learning models 110. For example, operation 304 includes inputting the aggregated time series data 108 to an LSTM models with autoencoders 112. Operation 306 includes inputting the aggregated time series data 108 to an LSTM model with uncertainty estimation 114. Operation 308 includes inputting the aggregated time series data 108 to an LSTM model with dropouts 116. In various embodiments, operations 304-308 can occur in parallel or sequentially according to the configuration of the anomaly detection system 102.

Operation 310 includes assigning a majority classification to corresponding outputs of the ensemble of deep learning models 110. For example, two of the three models may classify a respective portion of the aggregated time series data 108 as anomalous, whereas the third model may classify the respective portion of the aggregated time series data 108 as non-anomalous. In this example, operation 310 classifies the respective portion of the aggregated time series data 108 as anomalous because a majority (e.g., two out of three) of models in the ensemble of deep learning models 110 classified the respective portion of the aggregated time series data 108 as anomalous. In some embodiments, operation 310 is referred to as a voting method for determining classifications of respective portions of the aggregated time series data 108. In some embodiments, operation 310 can further assign a confidence to the majority classification, where the confidence can be based, at least in part, on the number of models that shared the same majority classification.

Figure 3B:
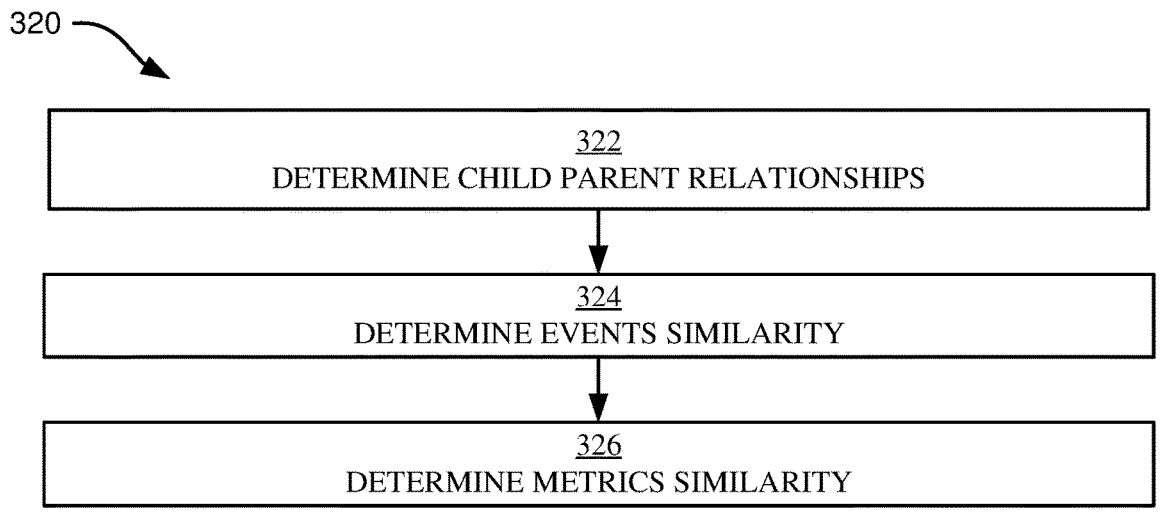
FIG. 3B illustrates a flowchart of an example method for grouping detected anomalies, in accordance with some embodiments of the present disclosure.

Referring now to FIG. 3B, illustrated is a flowchart of an example method 320 for grouping detected anomalies, in accordance with some embodiments of the present disclosure. The method 320 can be implemented by, for example, an anomaly detection system 102, a processor, a computer, or another configuration of hardware and/or software. In some embodiments, the method 320 is a sub-method of operation 212 of FIG. 2.

Operation 322 includes determining child-parent relationships amongst the detected anomalies 120. Child-parent relationships can, for example, consolidate anomalies 120 coming from a same host or a same technology between multiple hosts insofar as anomalies 120 with child-parent relationships are likely generated by a same root cause issue.

Operation 324 includes determining event similarities amongst the detected anomalies 120. Event similarity can be used to compare the detected anomalies 120 to historical data to find similar historical precedents. For example, cosine similarity can be used to determine the similarity between current patterns of anomalies 120 and historical patterns of anomalies. In some embodiments, anomalies 120 can be grouped so that the cosine similarity between the grouped anomalies 122 and a historical precedent of a similar grouping of anomalies exceeds a threshold. Said another way, grouping the anomalies 120 can be based on a cosine similarity between a respective group of grouped anomalies 122 and a historical group of anomalies satisfying a threshold. Using cosine similarity can be advantageous insofar as cosine similarity is well-suited to characterizing similarity between data with high dimensionality as is the case in comparing sets of anomalies 120 to each other where each of the anomalies 120 can include many features.

Operation 326 includes determining metrics similarity amongst the detected anomalies 120. Metrics similarity can be used to determine relationships between the raw time series data 104. In some embodiments, autoencoders can be used to identify these relationships. Said another way, grouping the anomalies 120 can be based on similarities between feature sets of anomalies, wherein the feature sets are generated using autoencoders. Using autoencoders can generate features with reduced dimensions that may be more suitable to determining useful groupings of detected anomalies.

Figure 4:
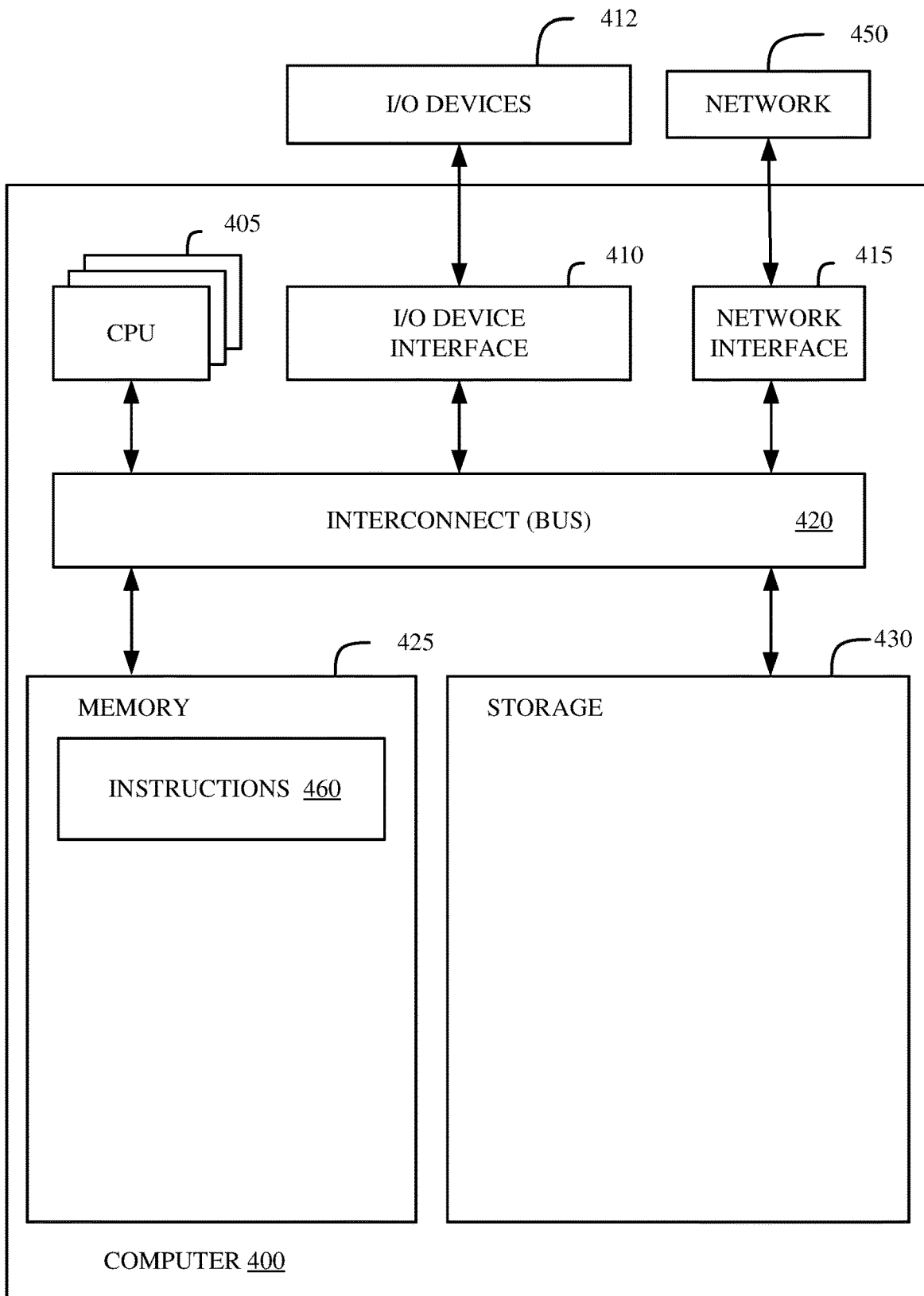
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform any or all of the methods described in FIGS. 2-3 and/or implement the functionality discussed in FIG. 1. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into (or functionality similar to computer 400 is virtually provisioned to) the anomaly detection system 102 of FIG. 1 or another aspect of the present disclosure.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP)), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random-access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, the methods of FIGS. 2-3 and/or implement the functionality discussed in FIG. 1. In some embodiments, instructions 460 can be referred to as an anomaly detection protocol, anomaly detection instructions, and/or an anomaly detection mechanism. Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
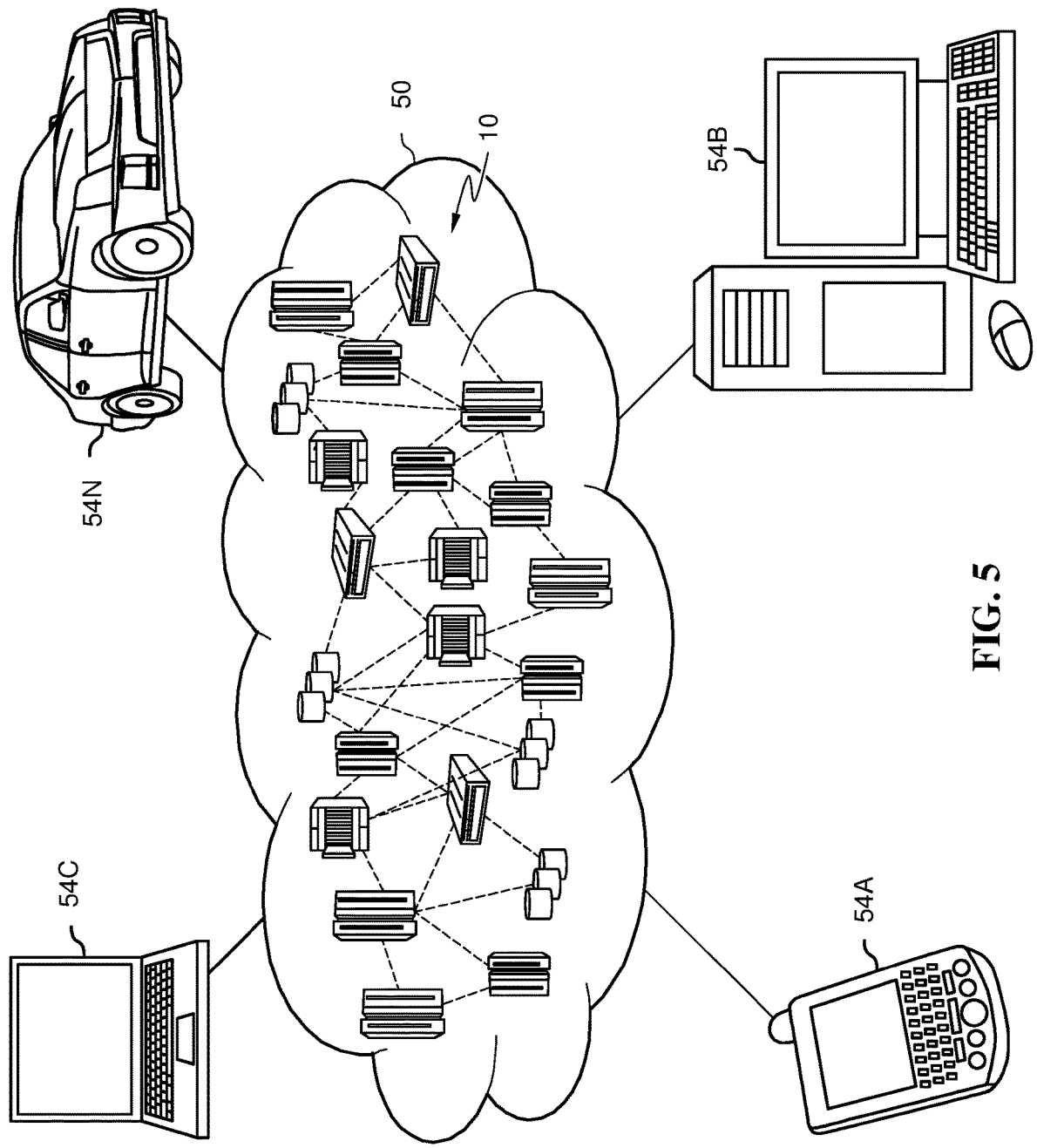
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
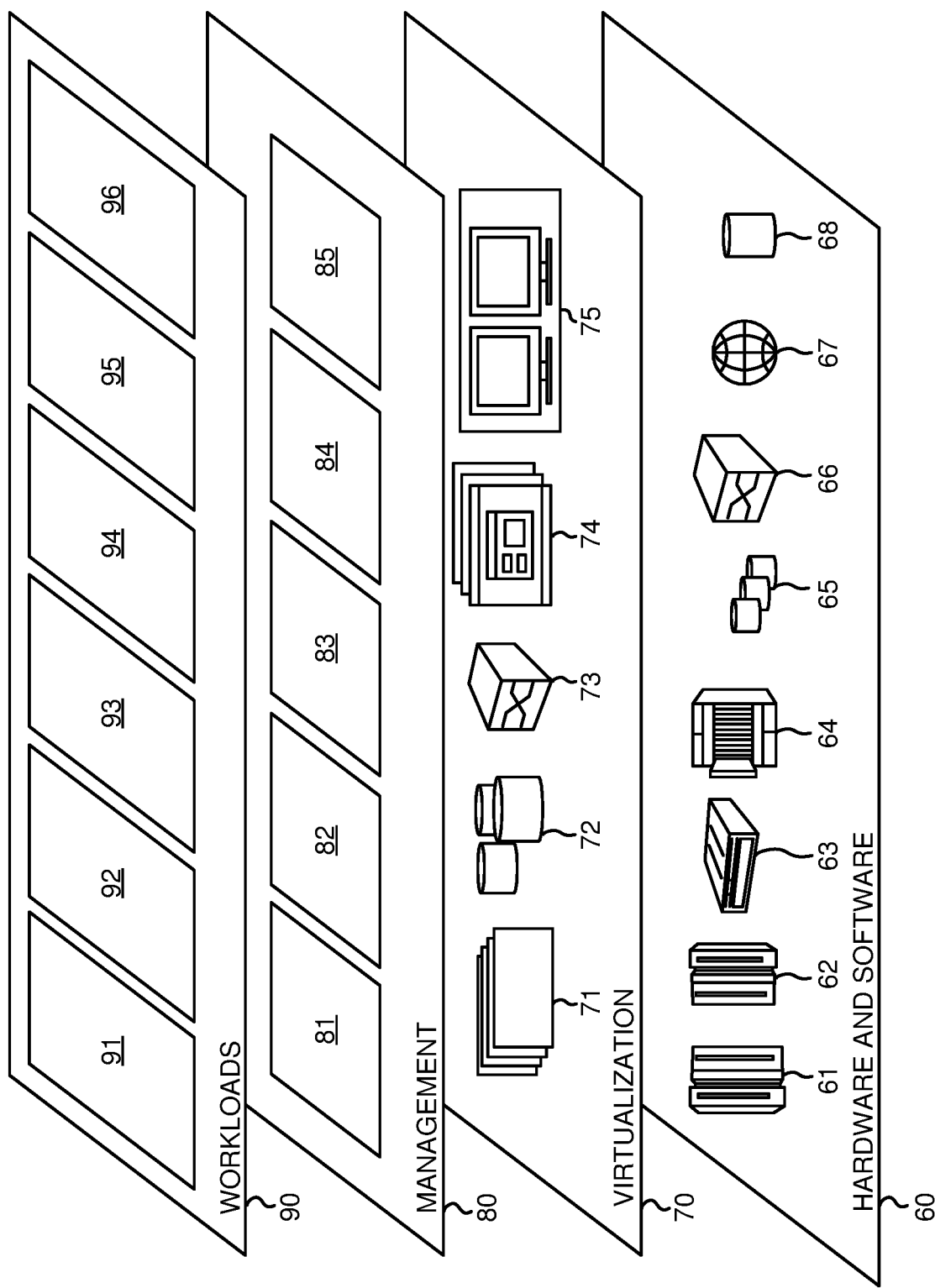
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any portion of the method described with respect to FIGS. 2-3 and/or implement any portion of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

Several non-limiting, example embodiments of the present disclosure will now be discussed.

Example 1. A computer-implemented method comprising training an ensemble of deep learning models using clustered time series training data from numerous components in an Information Technology (IT) infrastructure; inputting aggregated time series data to the ensemble of deep learning models; identifying anomalies in the aggregated time series data based on respective portions of the aggregated time series data that are indicated as anomalous by a majority of deep learning models in the ensemble of deep learning models; grouping the anomalies according to relationships between the anomalies; and performing a mitigation action in response to grouping the anomalies.

Example 2. The method of Example 1, wherein the clustered time series training data are clustered using fuzzy clustering.

Example 3. The method of Example 1, wherein the clustered time series training data are clustered using fuzzy clustering with dynamic time warping distance.

Example 4. The method of any of Examples 1-3, wherein the ensemble of deep learning models comprises at least three types of deep learning model.

Example 5. The method of any of Examples 1-4, wherein the ensemble of deep learning models comprises a plurality of long short-term memory (LSTM) models.

Example 6. The method of Example 5, wherein one of the deep learning models of the ensemble of deep learning models comprises a LSTM model with autoencoders.

Example 7. The method of Example 5, wherein one of the deep learning models of the ensemble of deep learning models comprises a LSTM model with uncertainty estimation.

Example 8. The method of Example 5, wherein one of the deep learning models of the ensemble of deep learning models comprises a LSTM model with dropouts.

Example 9. The method of any of Examples 1-8, wherein grouping the anomalies is based on child-parent relationships between the anomalies.

Example 10. The method of any of Examples 1-9, wherein grouping the anomalies is based on a cosine similarity between a group of anomalies and a historical group of anomalies.

Example 11. The method of any of Examples 1-10, wherein grouping the anomalies is based on similarities between feature sets of anomalies, wherein the feature sets are generated using autoencoders.

Example 12. The method of any of Examples 1-11, further comprising generating the clustered time series training data by removing anomalies from historical data using an Extreme Studentized Deviate (ESD) test.

Example 13. The method of Example 12, wherein the Extreme Studentized Deviate (ESD) test comprises a seasonal hybrid generalized ESD test.

Example 14. The method of any of Examples 1-13, the method further comprising receiving feedback related to the anomalies; updating the clustered time series training data based on the feedback; and re-training the ensemble of deep learning models using the updated clustered time series training data.

Example 15. The method of any of Examples 1-13, the method further comprising receiving feedback related to the anomalies; and suppressing at least one anomaly based on the feedback.

Example 16. The method of any of Examples 1-15, wherein the method is performed by an anomaly detection system according to software that is downloaded to the anomaly detection system from a remote data processing system.

Example 17. The method of Example 16, wherein the method further comprises metering a usage of the software; and generating an invoice based on metering the usage.

Example 18. The method of Example 1, wherein the clustered time series training data is clustered using fuzzy clustering with dynamic time warping distance; and wherein the ensemble of deep learning models comprises a first long short-term memory (LSTM) model with autoencoders, a second LSTM model with uncertainty estimation, and a third LSTM model with dropouts.

Example 19. A system comprising: one or more processors; and one or more computer-readable storage media storing program instructions which, when executed by the one or more processors, are configured to cause the one or more processors to perform a method corresponding to any of the Examples 1-18.

Example 20. A computer program product comprising one or more computer readable storage media, and program instructions collectively stored on the one or more computer readable storage media, the program instructions comprising instructions configured to cause one or more processors to perform a method corresponding to any of the Examples 1-18.

What is claimed is:

1. A computer-implemented method comprising:
   training a plurality of ensembles of deep learning models using clustered time series training data from numerous components in an Information Technology (IT) infrastructure, the clustered time series training data having been generated through removal of anomalies, using a statistical method, from historical time series data from the numerous components in the Information Technology (IT) infrastructure, and by clustering the historical time series data with removed anomalies to generate the clustered time series training data, wherein each ensemble in the plurality of ensembles is trained using a corresponding cluster in the clustered time series training data;
   inputting aggregated time series data to a respective ensemble of deep learning models, the respective ensemble of deep learning models being determined based on matching the inputted aggregated time series data to a corresponding cluster used to train the respective ensemble;
   identifying, using a voting method, anomalies in the aggregated time series data based on respective portions of the aggregated time series data that are indicated as anomalous by a majority of deep learning models in the respective ensemble of the deep learning models;
   grouping the anomalies according to relationships between the anomalies; and
   performing a mitigation action in response to grouping the anomalies.

2. The method of claim 1, wherein the clustered time series training data are clustered using fuzzy clustering.

3. The method of claim 1, wherein the clustered time series training data are clustered using fuzzy clustering with dynamic time warping distance.

4. The method of claim 1, wherein the respective ensemble of deep learning models comprises at least three types of deep learning model.

5. The method of claim 1, wherein the respective ensemble of deep learning models comprises a plurality of long short-term memory (LSTM) models.

6. The method of claim 5, wherein one deep learning model of the respective ensemble of deep learning models comprises a LSTM model with autoencoders.

7. The method of claim 5, wherein one deep learning model of the respective ensemble of deep learning models comprises a LSTM model with uncertainty estimation.

8. The method of claim 5, wherein one deep learning model of the respective ensemble of deep learning models comprises a LSTM model with dropouts.

9. The method of claim 1, wherein grouping the anomalies is based on child-parent relationships between the anomalies.

10. The method of claim 1, wherein grouping the anomalies is based on a cosine similarity between a group of anomalies and a historical group of anomalies.

11. The method of claim 1, wherein grouping the anomalies is based on similarities between feature sets of anomalies, wherein the feature sets are generated using autoencoders.

12. The method of claim 1, further comprising:
    generating the clustered time series training data by removing anomalies from historical data using an Extreme Studentized Deviate (ESD) test.

13. The method of claim 12, wherein the Extreme Studentized Deviate (ESD) test comprises a seasonal hybrid generalized ESD test.

14. The method of claim 1, further comprising:
receiving feedback related to the anomalies;
updating the clustered time series training data based on the feedback; and
re-training the multiple ensembles of deep learning models using the updated clustered time series training data.

15. The method of claim 1, further comprising:
receiving feedback related to the anomalies; and
suppressing at least one anomaly based on the feedback.

16. The method of claim 1, wherein the method is performed by an anomaly detection system according to software that is downloaded to the anomaly detection system from a remote data processing system.

17. The method of claim 16, wherein the method further comprises:
metering a usage of the software; and
generating an invoice based on metering the usage.

18. A system comprising:
one or more processors; and
one or more computer-readable storage media storing program instructions which, when executed by the one or more processors, are configured to cause the one or more processors to perform a method comprising:
training a plurality of ensembles of deep learning models using clustered time series training data from numerous components in an Information Technology (IT) infrastructure, the clustered time series training data having been generated through removal of anomalies, using a statistical method, from historical time series data from the numerous components in the Information Technology (IT) infrastructure, and by clustering the historical time series data with removed anomalies to generate the clustered time series training data, wherein each ensemble in the plurality of ensembles is trained using a corresponding cluster in the clustered time series training data;
inputting aggregated time series data to a respective ensemble of deep learning models, the respective ensemble of deep learning models being determined based on matching the inputted aggregated time series data to a corresponding cluster used to train the respective ensemble;
identifying, using a voting method, anomalies in the aggregated time series data based on respective portions of the aggregated time series data that are indicated as anomalous by a majority of deep learning models in the respective ensemble of the deep learning models;
grouping the anomalies according to relationships between the anomalies; and
performing a mitigation action in response to grouping the anomalies.

19. A computer program product comprising one or more computer readable storage media, and program instructions collectively stored on the one or more computer readable storage media, the program instructions comprising instructions configured to cause one or more processors to perform a method comprising:
training a plurality of ensembles of deep learning models using clustered time series training data from numerous components in an Information Technology (IT) infrastructure, the clustered time series training data having been generated through removal of anomalies, using a statistical method, from historical time series data from the numerous components in the Information Technology (IT) infrastructure, and by clustering the historical time series data with removed anomalies to generate the clustered time series training data, wherein each ensemble in the plurality of ensembles is trained using a corresponding cluster in the clustered time series training data;
inputting aggregated time series data to a respective ensemble of deep learning models, the respective ensemble of deep learning models being determined based on matching the inputted aggregated time series data to a corresponding cluster used to train the respective ensemble;
identifying, using a voting method, anomalies in the aggregated time series data based on respective portions of the aggregated time series data that are indicated as anomalous by a majority of deep learning models in the respective ensemble of the deep learning models;
grouping the anomalies according to relationships between the anomalies; and
performing a mitigation action in response to grouping the anomalies.

20. The computer program product according to claim 19, wherein the clustered time series training data utilizes fuzzy clustering with dynamic time warping distance; and
wherein the respective ensemble of deep learning models comprises a first long short-term memory (LSTM) model with autoencoders, a second LSTM model with uncertainty estimation, and a third LSTM model with dropouts.

* * * * *